US008069413B2

(12) United States Patent
Methot

(10) Patent No.: US 8,069,413 B2
(45) Date of Patent: *Nov. 29, 2011

(54) SYSTEMS FOR PROVIDING EXTENSIBLE HELP

(75) Inventor: John Douglas Methot, Seattle, WA (US)

(73) Assignee: BEA Systems, Inc., San Jose, CA (US)

( * ) Notice: Subject to any disclaimer, the term of this patent is extended or adjusted under 35 U.S.C. 154(b) by 1043 days.

This patent is subject to a terminal disclaimer.

(21) Appl. No.: 10/786,844

(22) Filed: Feb. 25, 2004

(65) Prior Publication Data

US 2004/0255234 A1 Dec. 16, 2004

Related U.S. Application Data

(60) Provisional application No. 60/451,293, filed on Feb. 28, 2003.

(51) Int. Cl.
*G06F 3/00* (2006.01)
(52) U.S. Cl. .................. 715/705; 715/708; 715/511
(58) Field of Classification Search ........ 704/1; 717/117, 717/109, 118; 709/203, 227; 715/705, 708, 715/511
See application file for complete search history.

(56) References Cited

U.S. PATENT DOCUMENTS

| 6,799,198 | B1* | 9/2004 | Huboi et al. ............... 709/203 |
| 7,024,658 | B1* | 4/2006 | Cohen et al. ............... 717/117 |
| 7,058,940 | B2* | 6/2006 | Calahan ..................... 717/167 |
| 2002/0184610 | A1* | 12/2002 | Chong et al. ............... 717/109 |
| 2003/0016238 | A1* | 1/2003 | Sullivan et al. ............. 345/705 |
| 2003/0028364 | A1* | 2/2003 | Chan et al. ..................... 704/1 |
| 2004/0003091 | A1* | 1/2004 | Coulthard et al. ........... 709/227 |

OTHER PUBLICATIONS

Adams et al. (Help-Part 1 Contributing a little help, Aug. 9, 2002) pp. 1-6.*
Adams et al. Help-Part 1 Contributing a little help, Aug. 9, 2002.*

* cited by examiner

*Primary Examiner* — William Bashore
*Assistant Examiner* — Sherrod Keaton
(74) *Attorney, Agent, or Firm* — Squire, Sanders & Dempsey (US) LLP

(57) ABSTRACT

Extensible online help systems and methods are described. There can be at least two parts to the extensible help facility, such as may include a help system and a help display. A help system can be integrated with runtime extensibility mechanisms to process documentation content upon import of an extension. A help display can support help display operations, such as providing search capabilities and a table of contents. This description is not intended to be a complete description of, or limit the scope of, the invention. Other features, aspects, and objects of the invention can be obtained from a review of the specification, the figures, and the claims.

16 Claims, 2 Drawing Sheets

200

SYSTEMS FOR PROVIDING EXTENSIBLE HELP

CLAIM TO PRIORITY

The present application claims the benefit of priority under 35 U.S.C. §119(e) to U.S. Provisional Patent Application entitled "SYSTEMS AND METHODS FOR PROVIDING EXTENSIBLE HELP", Application No. 60/451,293, filed on Feb. 28, 2003, which application is incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates to providing of help information to a use of a software application.

BACKGROUND

When a software developer extends a system or a development environment, that developer often wishes to extend any associated help systems. This often requires the developer to take a number of manual steps, often in a different environment, or using a different set of tools in the same environment. This problem arises in a number of situations, including adding help while developing new or extending existing controls to an extensible controls environment, as well as adding help while extending the Integrated Development Environment (IDE) itself.

SUMMARY

Systems in accordance with embodiments of the present invention can provide and/or utilize an extensible online help system. Such a help system can allow authors of software components such as controls and IDE extensions, including runtime environment components, to provide documentation and context-sensitive help for the components. Integration of help content for newly installed IDE extensions and controls can be automatic from the user's and extension/control developer's points of view, including integration of the new content in a 'Table of Contents' (TOC) and/or in a search facility. Format requirements for content, such as may be provided by IDE Extension and Control authors, for example, can be easy for authors to meet. Although embodiments discussed herein will be directed to specific examples such as for IDE extensions, it should be understood that extensible help can be utilized in many other software environments in which help might be offered to a user.

DETAILED DESCRIPTION

Figure 1:
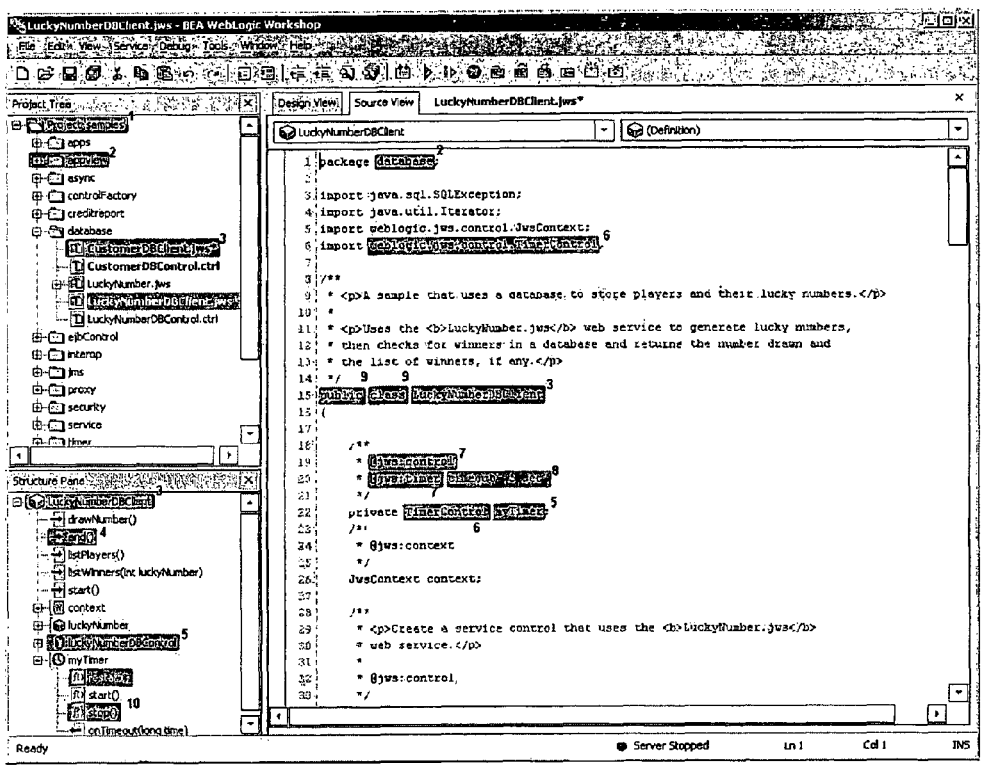
FIG. 1 is an illustration of a source view user interface in accordance with one embodiment of the present invention.

Systems in accordance with embodiments of the present invention can provide and/or utilize an extensible online help system. Such a help system can allow authors of software components such as controls and IDE extensions, including runtime environment components, to provide documentation and context-sensitive help for the components. Integration of help content for newly installed IDE extensions and controls can be automatic from the user's and extension/control developer's points of view, including integration of the new content in a 'Table of Contents' (TOC) and/or in a search facility. Format requirements for content, such as may be provided by IDE Extension and Control authors, for example, can be easy for authors to meet. Although embodiments discussed herein will be directed to specific examples such as for IDE extensions, it should be understood that extensible help can be utilized in many other software environments in which help might be offered to a user.

In some embodiments there are at least two parts to the extensible help facility, such as may include a help system and a help display. A help system can be integrated with runtime environment's development environment extensibility mechanisms to process documentation content upon import of an extension (be it an IDE Extension, a Control, or any future extension artifact). This may be a Service. A help display can be content in a markup language plus mechanisms necessary to support help display operations such as search and TOC.

In some embodiments, a help system can perform batch operations on otherwise static content. There can be a static help content collection before an extension is installed, and there can be a different static help content collection after an extension is installed. IDE extensions can be "installed" by restarting the IDE, for example. Controls can be installed and uninstalled by a user during an IDE session. A help display can display the current content collection, and may not have any dynamic content management responsibilities.

A number of help system embodiments are possible. It should be noted that some embodiments can have additional properties not discussed herein, and may not include all of the properties discussed herein.

Documentation Format

Documentation topics can be delivered to the help system in a common topic file format. The documentation format can support specification of alphabetical index entries. The documentation format can also support specification of a hierarchical Table of Contents. The documentation format can be in a markup language, such as HTML or XML. External authors, such as authors of IDE extensions and controls, can easily produce the documentation format. A help system can support delivery of help for a particular component in a single archive file. For example, in a Java language environment, the JAR file format can be supported; additional archive file formats (ZIP, TAR) can be supported.

Help Display

Help content can be viewable in a web browser. A help display can include an expandable Table of Contents. A Table of Contents can be externally controllable. It can be possible to cause the TOC to open to a particular node with the associated topic displayed in the help display content pane. In some cases, this be accomplished with an appropriate URL. A help display can present a pleasing appearance similar that used for the built in help of the IDE. In some cases, the help system can support the simultaneous display of a single topic and one of the TOC or search results panes.

Extensibility

A help system can be integrated with the IDE extension installation mechanism. For instance, when an IDE extension can be installed, the IDE extension's documentation (if present) can be integrated with the help system during the extension installation operation. A help system can be integrated with IDE control installation mechanism: when a control can be installed, the control's documentation (if present) can be integrated with the help system during the installation operation. A help system can tolerate installation of IDE extensions or control that do not provide documentation components. A help system can automatically integrate the documentation for a newly installed IDE extension or control into the TOC and search index. A help system can support automatic disintegration of content when an IDE extension or control can be uninstalled, including removal of all content from the TOC and search index. This requirement can be subject to the availability of uninstall events from the IDE extension mechanism. A help system can generate appropriate errors when an IDE extension or control can be installed and the associated documentation content can be present but not in the required format.

Search Facility

The help display can include a full-text search capability. The full-text search results can be displayed as a list of titles of topics matching the search criteria. The help display search capability can support operations such as the following: AND, OR, NEAR, NOT. Support for nested Boolean expressions may not be required in some embodiments.

Browser Support

The help display can support display in web browsers. The help display can assume access to the browser via URL (no API access).

Context-Sensitive Help

The help system can provide a context-sensitive help capability, allowing each of the following entities to be associated with a specific documentation topic that can be automatically displayed in the help system when requested via a standard gesture on the entity:

IDE widget (such as either core or in an extension)

Control (such as via variable in source view, icon in design view, title bar in properties pane)

Control property (such as via item in property pane, tag or attribute in source view)

Developer Documentation

Documentation can be provided to IDE extension authors describing how to construct documentation for an extension, as well as how to package and deliver the documentation for installation and how to cause display of context-sensitive help for IDE widgets. Documentation can also be provided for control authors describing how to construct documentation for a control, as well as how to package and deliver the documentation for installation and how to cause display of context-sensitive help for Controls and their properties.

External Requirements

In some embodiments, a help system can require a mechanism in the IDE architecture that allows determination of a unique context ID for each UI widget that can benefit from context-sensitive help. Such a help system can require a mechanism in the IDE architecture that allows determination of a unique context ID for each control class, method, callback, field and property. A help system can require the IDE to provide the mechanism to issue a context ID to the help display when the context-sensitive help gesture can be performed.

Additional Features

A help display can include an alphabetical index. A help display system can be integrated with a system-hosted help annotation system such that comments can be displayed with any given topic viewed by the user. A help system's integration with the help annotation system can dynamically adapt to the presence or absence of a network connection. If a connection can be available, topic comments can be obtained from the annotation server and displayed with the content. If a network connection may not be available, the help display can degrade gracefully. A help system can dynamically adapt to the presence or absence of help components: when a topic in one help component references a topic in another help component, the help display can degrade gracefully if the referenced help component may not be installed.

Developer and Author Model

In an IDE, for example, there can be at least two types of developers/authors who can provide content to the help system: IDE Extension developers and Control developers. The delivery mechanism for help content can be substantially the same for IDE Extensions and Controls. A help system can distinguish between general conceptual help topics and context-sensitive help topics. As described below, context-sensitive help can be organized by context ID, where context ID can be a URN that can be a fully qualified Java class name for control classes or an analogous hierarchical name for non-class items. The context-sensitive help topics can be organized in a directory hierarchy that parallels the namespace of the context IDs.

In the following section many of the concepts are illustrated by way of specific examples for one possible embodiment, intended for use with the Java programming language, XML and HTML documentation formats, and using a J2EE runtime environment. It will be understood that the invention is also applicable to both other embodiments using the Java programming language, XML, and HTML documentation formats, and the J2EE runtime environment or using different programming languages or runtime environments. Since these examples are provided purely for illustrative purposes, they shall not limit the scope, functionality or spirit of the invention.

Content Packaging

Help content for an IDE Extension or Control can be delivered in the directory structure shown below. This hierarchy can be rooted at the doc directory, which can be located at the top level of the extension.xml file (or exploded directory structure) for an IDE Extension and at the top level of the JAR file for a Control.

```
doc
    en-us
        com
            bea
                weblogic
                    ...
        directory1
            directory2
                ...
        toc.xml
```

All content can be organized in locale-specific directories below the doc directory. The com/bea/weblogic/ . . . and directory1/directory2/ . . . hierarchies shown represent two possible options for organization of content. The com/bea/weblogic/ . . . hierarchy represents structured content that follows the Javadoc convention for directory names and HTML files. This convention can be required for context-sensitive help topics to enable automatic translation of context IDs to topic URLs. The directory1/directory2/ . . . hierarchy represents freeform content organization.

Extension providers can deliver non-context-sensitive help content with arbitrary organization below the doc/[locale] directory. General context and context-sensitive content can be separated so that secondary documentation system such as e-docs can extract only the general content. The context-sensitive help topics may not be appropriate in secondary documentation systems.

A toc.xml file can be specified as an XML file for ease of handling at IDE Extension of Control install time. If it can be an XML file:

The file can be validated against known schema installation can be accomplished with simple DOM inserts into the current TOC hierarchy the APIs that look up and display topics based on user actions in the TOC or via the context sensitive help gesture can do simple lookup in the current comprehensive TOC DOM (or whatever data structure is used)

toc.xml Schema

A schema for a toc.xml file can include at least three XML element types, such as for example:

<toc-anchor name="name" label="label" url="url"> can provide a TOC node from which extension developers may hand additional content. name can be the name by which <toc-reference> elements can refer to this node. label can be the string displayed in the TOC for this node. url can be the optional URL of the topic to display when this node can be selected in the TOC. If a <toc-anchor> element does not have a url attribute, clicking on the <toc-anchor> node in the TOC expands and collapses the TOC node but does not display a topic. A <toc-anchor> can be similar to a <toc-node>, but only a <toc-anchor> may be referenced by a <toc-reference>. This allows us to control where extension developers may attach content in the TOC.

<toc-reference anchor="name"> can be a reference to a <toc-anchor> node that exists in the TOC. The name attribute can match the name attribute of a <toc-anchor> node. If no such <toc-anchor> node exists, defaults to <toc-reference name="top">.

<toc-node label="label" url="url"> can be a normal node in the TOC. <toc-node> elements may be arranged hierarchically and the hierarchy can be directly reflected in the displayed TOC.

A structure such as the following can be pre-defined:

```
<toc-anchor name="top" label="WebLogic Workshop">
    <toc-anchor name="std-controls" label="Standard Controls"
        url="ControlsOverview.html">
    <toc-anchor name="installed-controls" label="Installed
    Controls"
        url="InstalledControls.html">
</toc-anchor>
``` toc.xml for an Extension

A toc.xml file supplied with an extension can include a single top-level <toc-reference anchor="name"> element, which can be a reference to an existing <toc-anchor> element. For example, <toc-reference anchor="installed-controls">. The remainder of the toc.xml file can be a hierarchy of <toc-node> and <toc-anchor> elements.

A toc.xml file for a Control called ControlA might contain:

```
<toc-reference anchor="installed-controls">
    <toc-node title="MyCompany Controls"
    url="MyCompanyControls.html">
        <toc-node title="ControlA"
    url="controlA/ControlAOverview.html" />
            <toc-node title="Creating a New A Control"
    url="controlA/ControlACreating.html" />
            <toc-node title="ControlA Properties"
    url="control1/ControlA.html#Props" />
                <toc-node title="Foo Property"
    url="controlA/ControlA.html#Foo" />
                <toc-node title="Bar Property"
    url="controlA/ControlA.html#Bar" />
            </toc-node>
        </toc-node>
    </toc-node>
</toc-reference>
```

All URLs in a toc.xml file can be relative to the doc/[locale] directory in the extension's JAR file.

Context-sensitive Help

Context-sensitive help can require additional support to associate the current context with the desired topic, such as whenever F1 is pressed. An IDE can include the capability to determine a context ID for every context-sensitive widget in the UI. A context ID can always be an URN within a namespace defined by the help system. The URN may be a fully qualified Java class name or a fully qualified name of some other resource such as a property/tag name.

IDE Extensions

IDE Extension developers can associate context-sensitive help topics with individual widgets in an IDE in order to support F1 help. The term widget as used herein refers to both traditional user interface controls such as buttons and text boxes and also to non-control visual items in the UI such as icons placed on a drawing surface or in a palette or to tokens in source view. The widgets for which context-sensitive help can be available can be determined entirely by the IDE Extension developer.

Controls

Control developers may need to associate context-sensitive help topics with the control type itself, as well as with individual properties/tags. Different controls can have different semantics associated with their methods, callbacks, and associated UI artifacts. For example, a database control method "map icon" can be associated with a SQL statement, and an AppView control callback can be associated with an Application View event.

The list of UI widgets a control developer may wish to provide context-sensitive help for can include, for example:

All properties in the property editor (attributes can be documented with their associated property).

Arrows for methods and callbacks: display documentation for the specific method or callback. This applies both when the control itself can be being edited (center of Design View canvas) and when the control is being referenced (right side of Design View canvas).

Methods, callbacks and fields in the Structure Pane.

Control "berth" (the "control instance" that is displayed in the JWS area in V1 jellybeans).

Control icon (separate icon on RHS).

Control's palette icon.

Control's menu item in Control->Add menu (if present).

Documentation Skeleton Generation Tool

Given that a namespace structure can be fixed, a tool can be provided that can walk the extension.xml file(s) associated with an IDE extension or the control-tags.xml file within a Control's JAR file, and can produce a list of context IDs for that extension. This can serve as a manifest of context-sensitive help topics that can be provided by the IDE Extension or Control documentation author. An automatically generated skeleton can contain nodes that are semantically equivalent. Authors can use HTML redirects, for example, to refer all semantically equivalent topics to a single URL.

Content Format

Content can be delivered in HTML that conforms to an Extensible Help Style Guide. Well-formed HTML can be required in some embodiments, and the allowed tags can be limited. An IDE documentation team can prescribe how the topic documents can be organized, can provide templates for various topic types, and can specify how to include index entries using <meta> tags.

Integration Model

An IDE framework can include a base help system. A base help system can include all of the capabilities described in this section. A help system can be implemented as an IDE "Help Service".

In the following section, many of the concepts are illustrated by way of specific examples for one possible embodiment, intended for use with the Java programming language, XML and HTML documentation formats, and using a J2EE runtime environment. It will be understood that advantages of such embodiments can be applicable to other embodiments using the Java programming language, XML and HTML documentation formats, and the J2EE runtime environment, or embodiments using different programming languages or runtime environments. Since these examples are provided purely for illustrative purposes, they should not be read to limit the scope, functionality or spirit of the invention.

Content Installation and Uninstall

An IDE framework can invoke a help system when the IDE notices a new IDE Extension or Control. At that time, the help system can merge the help content and table of contents provided by the added component with the current help content and TOC, and can re-compute the search index over the newly expanded set of help content. The help system can also remove the appropriate help content and table of contents nodes when an IDE Extension or Custom Control is uninstalled.

A help system can keep track of where the various collections of content reside, such as in which JAR file. URLs in a toc.xml file, URNs generated for context-sensitive help, and relative URLs within content collections can be resolved to an appropriate JAR file when a topic is to be displayed.

When a control or extension is installed, the content can be added to the global collection of content for the current Runtime environment Plafform installation, such as across all users, workspaces and projects. Since there may be no explicit "uninstall" semantics for extensions, and since controls could be uninstalled by deleting the JAR file when the IDE may not be running, a lazy "uninstall when not found" approach can be used. When a user selects a topic from the TOC or from search results, and the topic may no longer installed, at all content for that extension can be removed from the TOC. The search index can then be recomputed without that extension's content.

One alternative approach is to cache the state of the file system, or at least those portions that contain IDE extensions and controls, and recompute the TOC and search index from scratch when a change is noticed.

Context-sensitive Help

An IDE can be responsible for resolving the correct context ID when a user performs a context-sensitive help gesture on a widget in the UI. The IDE can then pass the context ID on to the help system, which can use the context identifier to look up the topic and drive the help display to that topic.

There can be cases in which more than one context ID are appropriate to the selected widget. For example, if F1 is pressed on a control instance variable in Source View, there may be help available for the specific control class (such as MyDBControl), but there can be help available for the superclass (such as DatabaseControl). Another example can include a method on a JWS, where there might be help available on the JWS class itself (e.g. if it can be a sample), but there can be help available on the concept of a JWS operation. These kinds of information (class hierarchy, widget semantics in the IDE) can be easily available to an IDE, but may not be visible to the help system. It can seem inappropriate for a help system to talk directly to a parser, for example.

To support such an approach, the IDE can pass a list of context IDs, ordered by preference, to the help system. Some context IDs may not translate to URLs that exist, in which case that context ID can be silently ignored. When a list of context ID is received by a help system, the system can dynamically generate a page listing the available topics.

The screens shown in the Figures can be annotated with widgets that might support context-sensitive help. The annotations associated with the images can describe the context ID to which each widget can resolve. Examples are only shown for JWS files, but the concept can be extensible to other file types and other programming language environments as would be found in other embodiments.

IDE UI Widgets

All screen areas, menus, menu actions and toolbar icons can have context-sensitive help. IDE framework classes can be augmented with methods to return their context ID when the context-sensitive help gesture occurs on them. The value returned can depend on the type of widget selected, but may always be a fully qualified class name.

As an example, the class hierarchy of action classes associated with the menu actions in the Shell extension can be reproduced below:

```
workshop
    shell
        actions
            file
                FileNewAction
                FileOpenAction
                FileCloseAction
                FileImportAction
                FileCloseAllAction
                FileSaveAction
                FileSaveAsAction
                FileCopyAction
                FileMoveAction
                PopupFileSaveAction
                PopupFilCloseAction
                DuplicateItemsAction
                PopupFileNewAction
                PopupFolderNewAction
                PopupFileImportAction$Popup
            UndoAction
            RedoAction
            ExitAction
            CutAction
            CopyAction
            PasteAction
            DeleteAction
            ShowPropertiesAction
            HelpAction
            AboutWorkshopAction
            SwitchDocumentAction$Next
```

-continued

OutputActions$Clear
OutputActions$Stop
OutputActions$CopyAll
OutputActions$NextItem
OutputActions$PreviousItem For widgets that may not be actions, the IDE can generate a suitable class name to represent the context. For example, the user may press F1 while the cursor can be in the background of the Project Tree, in which case the help topic displayed can describe the Project Tree as a whole, such as urn:java-class:workshop.workspace.WorkspaceTreeContainer.

Source View

Context IDs generated for parts of the Source View UI that may not be traditional. Some possible embodiments of UI widgets are described in this section. FIG. 1 shows a screenshot that will be discussed in this section. The gray areas in FIG. 1 are possible examples of widgets that respond to the context-sensitive help gesture.

A project can be a Java package. The primary context ID can be the package name, e.g. urn:java-class:samples. The secondary context ID can be urn:java-class:workshop.extension.projectType.

Folders within a package can represent the project.folder Java package. The primary context ID can be the fully qualified package name, e.g. urn:java-class:samples.appview. The secondary context ID indicates the selected area of the IDE. For example, urn:java-class:workshop.workspace. WorkspaceTreeContainer or urn:java-class:workshop.webservices.designview. JwsDesignView.

A filename or a top-level node in a Structure Pane can represent an interface or class. The primary context ID can be the fully qualified class name urn:java-class:package.class. The secondary context ID can be the named class' superclass (recursively) in a package such as weblogic.jws.control package. This can resolve to an installed control interface for a CTRL file, e.g. urn:java-class:weblogic.jws.control.TimerControl. In the case of JWS or JAVA files (or other file types), there may be no documented superclass in the inheritance tree, in which case the secondary context ID resolves to an extension document class of the form urn:java-class:workshop.extension.document.documentType, for example urn:java-class:workshop.webservices.document.JwsDocument.

For a class name or variable name, the primary context ID can be the fully qualified class. There may not be doc on it if it can be a user class, but if it can be a standard Java class like java.lang.String (context ID urn:java-class:java.lang.String) doc can be displayed for that class. The secondary context ID can be the class' immediate package: urn:java-class:package. If that doesn't exist either, nothing may be displayed. Doc may not be displayed for java.lang.Object or java.* packages.

A control or context instance variable can be similar to that described above. The primary context ID can be the fully qualified Java class name, e.g. urn:java-class:weblogic.jws-.control.JwsContext. The secondary context ID can be the same as the secondary context ID above.

The short form of a class name can resolves to it's fully qualified form.

Prefixed Javadoc tags can resolve to a context ID of urn: javadoc-tag:prefix.tagname, e.g. urn:javadoc-tag:jws.control. Standard Javadoc tags (@param, @return) can be treated as though they have the prefix none, for example urn:java-class-tag: none.tagname.

The context ID for a Javadoc tag attribute can be the same as for the tag, but with #attribute appended. In the pictures example, the context ID can be urn:javadoc-tag: jws.timer#timeout.

For language keywords, a context ID can be in the urn: keyword namespace and can be specified by a language identifier and the keyword, e.g. urn:keyword:java.public.

For a method, callback or field (including declarations and references/invocations), the primary context ID can be the fully qualified class name of the control or context class followed by the method or field name, e.g. urn:java-class: weblogic.jws.control.JwsContext#finishConversation. If a topic does not exist for the class, the IDE can look for a superclass with a documented method of the same name and the secondary context ID can be the fully qualified name of that class. The tertiary context ID resolves to the document type and selected item. For example urn:java-class:workshop.webservices.document. JwsDocument#startMethod or urn:java-class:workshop.webservices.document. JwsDocument#callback.

For a callback handler (not shown), the IDE can determine the control class. The context ID can be urn:java-class: package.class#callback. For example, for the callback handler myTimer_on Timeout, the context ID would be urn:java-class:weblogic.jws.control.TimerControl#on Timeout.

A user may press F1 when the cursor can be in the background of an area of the IDE (not on a specific widget). In this case, the context ID can be the class name of the IDE frame the cursor can be within. For example, pressing F1 with the cursor on the title bar or background of the Project Tree would produce the context ID urn:java-class:workshop.workspace. WorkspaceTreeContainer.

Design View

Figure 2:
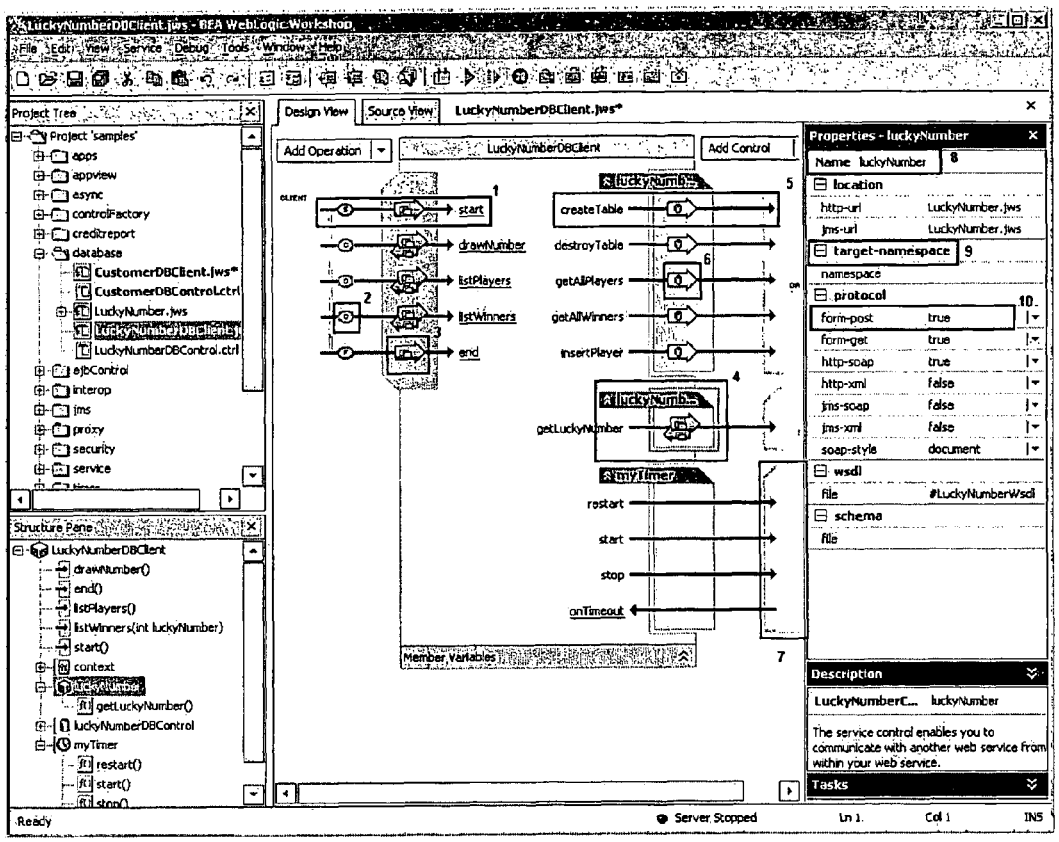
FIG. 2 is an illustration of a design view user interface in accordance with one embodiment of the present invention.

Context IDs generated for the parts of the Design View UI may not be traditional. Some possible examples of UI widgets are described in this section. An example a design view UI in accordance with one embodiment of the present invention is illustrated in FIG. 2. For the purposes of this section, the class currently being edited in FIG. 2 (the big box in the middle of Design View) can be referred to as the target class. For a method or callback of the target class, the primary context ID can be urn:java-class:package.class#method. For example, urn:java-class:samples.database. LuckyNumberDBClient#start. The secondary and tertiary context ID can be as described above.

A conversation icon may not be individually selectable. Selection of the conversation icon can be the same as a selection anywhere on the method arrow. The context ID can be the same as above. A map icon can be not individually selectable. Selection of a map icon can be the same as a selection anywhere else on the method arrow. The context ID can be the same as immediately above.

A top-level node in the Properties Pane can be an instance of a class (in the JWS case, for example) or a control interface (if a control can be selected). A property name can be really a custom tag name, including a prefix. The context ID for a control property/tag can be urn:java-class-tag:prefix.tagname. For example, urn:java-class-tag:jws.target-namespace. The context ID for a property attribute can be the same as described above, but with #attribute appended. In the pictured example, the context ID can be urn:javadoc-tag: jws.protocol#form-post.

Other Contexts

Custom Tags from JSP Taglibs

Web applications can include custom JSP tag libraries. Context-sensitive help can be provided for all tags the user may see in a JSP, including standard HTML tags and tags from custom taglibs. Each taglib can be uniquely identified by a <uri> element in the taglib's TLD file. The context IDs for taglib tags can follow the pattern urn:taglib:taglib-namespace/tag, where taglib-namespace can be the value of the taglib's <uri> scoping element. If the taglib URI starts with a protocol specification, it can be stripped off before using the URI as part of the context ID URN.

The context ID for a tag can have the general format:

urn:taglib:<taglib-uri>/<tag-name>

The context ID can resolve to a tag property using the following notation (for the name property of the form tag):

urn:taglib:<taglib-uri>/<tag-name>#<property-name>

Standard HTML Tags

Standard HTML tags can be documented and can be covered by the urn:taglib:html-4.01 node in the summary below. For example, the context ID for the HTML <p> tag can be:

urn:taglib:www.w3.org/TR/html4/p based on the URI of the Transitional HTML 4 DTD:

http://www.w3.org/TR/html4/loose.dtd

Struts Taglibs

A Struts framework can define six taglibs with the following <uri>s:

http://jakarta.apache.org/struts/tags-bean-1.0
http://jakarta.apache.org/struts/tags-html-1.0
http://jakarta.apache.org/struts/tags-logic-1.0
http://jakarta.apache.org/struts/tags-nested-1.0
http://jakarta.apache.org/struts/tags-template-1.0
http://jakarta.apache.org/struts/tags-tiles-1.1

As an example, the context ID for the form tag in the Struts html taglib is:

urn:taglib:jakarta.apache.org/struts/tags-html-1.0/form

The context ID for the name property of the form tag can be:

urn:taglib:jakarta.apache.org/struts/tags-html-1.0/form#name

Standard Javadoc Tags

Standard Javadoc tags can be documented and can be covered by the urn:tag:none node in the summary below. For example, the context ID of the @since Javadoc tag can be:

urn:tag:none/since

The runtime platform integration facilities and tools can also provide their own IDE extensions. If there are additional contexts that are not already covered herein, the context ID scheme for those extensions can be consistent with the schemes described here.

Context ID Namespace Summary

The following is a summary of the URN namespace described above:

```
javadoc-tag
   jws
      context
      control
      ...
   none (we need to provide help for the standard (non-prefixed) Javadoc tags)
      author
      param
      since
      return
      version
      exception
      ...
   other-prefix
      ...
taglib
   jakarta.apache.org
      struts
         tags-html-1.0
            form
         tags-bean-1.0
            cookie
         ...
   www.w3.org
      TR
         html4
            html
            head
            body
            p
            ol
            ul
            li
            ...
   other-taglib-uri
      ...
keyword
   java
      public...
   jsp
   xscript
java-class
   workshop
      shell
         actions
            action
         projectType)
      extensionPackageA
         extensionSubpackageAA
            ExtensionClassAAA
      controlPackageB (controls can be just packages and classes)
         controlClassBB
      projectC (
         folderCC
            ClassCCC
```

External packages for which Javadoc can be installed with the product and made available via context-sensitive help:
    weblogic.jws.* (public classes: JwsContext, DatabaseControl, ServiceHandle, etc.)
    org.w3c.dom.*
    org.apache.struts.*
    org.apache.tools.ant.* (since projects can include a build.xml file, we can provide doc support for ant)
    java.* (from Sun J2SE doc)
    javax.* (from Sun J2SE doc)
    javax.* (from BEA J2EE doc)

Context ID to URL Translation

A help system can translate context IDs to URLs before the help display can be driven to the appropriate topic. The translation can be literal and assume the directory and filename structure of the context-sensitive help content can be identical to the structure of the namespace. Some possible example translations are shown in the following table.

| Context ID | URL |
| --- | --- |
| urn:javadoc-tag:jws.control | javadoc-tag/jws/control.html |
| urn:taglib:jakarta.apache.org/struts-tags-html-1.0/form[#name] | taglib/jakarta.apache.org/struts/tags-html-1.0/form.html[#name] |
| urn:keyword:java.public | keyword/java/public.html or keyword/java.html#public |
| urn:java-class:workshop.shell.actions.file.FileNewAction | java-class/workshop/shell/actions/file/FileNewAction.html |
| urn:java-class:packageA.subpackageAA.ClassAAA | java-class/packageA/subpackageAA/ClassAAA.html |

All of the help content for every extension does not have to be copied from the delivery JAR files to exploded form. To avoid that, a mechanism can be used to determine to which JAR file a particular URL can resolve. At extension install time, then, an associative array can be generated that maps packages to JAR files, and the help display system can have the capability to extract content from JAR files on demand for display.

The table of contents and search index can still physically merged. The same or a similar mechanism for associating a URL with a JAR file can be used when selections are made in the TOC. A search index generator can also have to run over content stored in JAR files.

Help Buttons

Help buttons on dialogs can use the context-sensitive help facility to obtain a URL for the appropriate help topic. The context ID can be the fully qualified class name of the dialog.

Search

A search facility can perform full-text searches against the entire collection of currently installed help content. The topic crawling can be completely provided by the developer, so it can crawl JAR files.

Exemplary Implementation

The following is an example of implementation details that can be used with certain embodiments:
1. Implement getContextID method in IElement interface with default behavior.
2. Design and implement documentation skeleton generation tool.
3. Design and implement help install/uninstall tool, including:
    a. Table of contents merge/unmerge
    b. Alphabetical index merge/unmerge
    c. Search index regeneration
    d. URL->Jar file association
4. Design and implement help display, including:
    a. Expandable table of contents
    b. Integration with search engine
    c. URL->JAR file locator/extractor
5. Create help content style guides and templates
6. Identify and integrate a search engine.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system, executed by a processor, for extending online help for an integrated development environment, comprising:
    a help system configured to merge documentation content of an integrated development environment extension with current documentation content of the integrated development environment upon import of the integrated development environment extension into the integrated development environment, wherein the help system includes context-sensitive help topics; and
    a help display, wherein search capabilities and table of contents are automatically updated to reflect the documentation content after the integrated development environment extension is imported, wherein the help display is configured to display the documentation content in a web browser;
    wherein the documentation content for the integrated development environment extension is integrated with the help system during the import of the integrated development environment extension,
    wherein when a control is installed, documentation for the control is integrated with the help system during the installation of the control into the integrated development environment,
    wherein the integrated development environment issues a context ID to the help display when a context-sensitive help gesture is performed, wherein the context ID comprises a uniform resource name that is a fully qualified Java class name for control classes, and
    wherein the help system is integrated with an extension installation mechanism of the integrated development environment.

2. The system of claim 1 wherein help display is externally controllable.

3. The system of claim 1 wherein the context-sensitive help topics are organized by a context ID.

4. The system of claim 3 wherein the context ID is a fully qualified name from a non-Java resource.

5. The system of claim 1, wherein the documentation content is in HTML or XML format.

6. The system of claim 1, wherein the documentation content supports delivery of help for a particular component in a JAR file.

7. The system of claim 1, wherein integrated development environment widgets, controls, and control properties are associated with documentation topics that are automatically displayed in the help system when requested by a user performing a context-sensitive help gesture.

8. The system of claim 1, wherein each control class, method, callback, field, and property has a unique context ID.

9. A method for extending online help for an integrated development environment, comprising:
- importing an integrated development environment extension into the integrated development environment;
- merging documentation content of the integrated development environment extension with current documentation content of the integrated development environment upon import of the integrated development extension, wherein the documentation content includes context-sensitive help topics with respect to the integrated development environment extension; and
- displaying operations for a help system, wherein search capabilities and table of contents are automatically updated to reflect the documentation content after the integrated development environment extension is imported, wherein a help display is configured to display the documentation content in a web browser;
- wherein the documentation content for the integrated development environment extension is integrated with the help system during the import of the integrated development environment extension into the integrated development environment,
- wherein when a control is installed, documentation for the control is integrated with the help system during the installation of the control into the integrated development environment,
- wherein the integrated development environment issues a context ID to the help display when a context-sensitive help gesture is performed wherein the context ID comprises a uniform resource name that is a fully qualified Java class name for control classes, and
- wherein the help system is integrated with an extension installation mechanism of the integrated development environment.

10. The method of claim 9, wherein the help display is externally controllable.

11. The method of claim 9, wherein the context-sensitive help topics are organized by a context ID.

12. The method of claim 11, wherein the context ID is a fully qualified name from a non-Java resource.

13. The method of claim 9, wherein the documentation content is in HTML or XML format.

14. The method of claim 9, wherein the documentation content supports delivery of help for a particular component in a JAR file.

15. The method of claim 9, wherein integrated development environment widgets, controls, and control properties are associated with documentation topics that are automatically displayed in the help system when requested by a user performing a context-sensitive help gesture.

16. The method of claim 9, wherein each control class, method, callback, field, and property has a unique context ID.

* * * * *

UNITED STATES PATENT AND TRADEMARK OFFICE
CERTIFICATE OF CORRECTION

| | | |
|---|---|---|
| PATENT NO. | : 8,069,413 B2 | Page 1 of 1 |
| APPLICATION NO. | : 10/786844 | |
| DATED | : November 29, 2011 | |
| INVENTOR(S) | : John Douglas Methot | |

It is certified that error appears in the above-identified patent and that said Letters Patent is hereby corrected as shown below:

On the Title Page:

Item (73) Assignee should read: Oracle International Corporation, Redwood Shores, CA (US)

In column 7, line 51, delete "Plafform" and insert -- Platform --, therefor.

In column 8, line 54, delete "PopupFilCloseAction" and insert -- PopupFileCloseAction --, therefor.

In column 9, line 33, delete "designview. JwsDesignView." and insert
-- designview.JwsDesignView. --, therefor.

In column 10, line 18, delete "document. JwsDocument" and insert -- document.JwsDocument --, therefor.

In column 10, line 19-20, delete "document. JwsDocument" and insert -- document.JwsDocument --, therefor.

In column 10, line 24, delete "myTimer_on Timeout," and insert -- myTimer_onTimeout, --, therefor.

In column 10, line 25, delete "on Timeout." and insert -- onTimeout. --, therefor.

In column 16, line 3, in Claim 9, delete "performed" and insert -- performed, --, therefor.

Signed and Sealed this
Twenty-seventh Day of March, 2012

David J. Kappos
*Director of the United States Patent and Trademark Office*